United States Patent [19]

Edelman et al.

[11] Patent Number: 4,941,943

[45] Date of Patent: Jul. 17, 1990

[54] PROCESS FOR PREPARING SODIUM CARBOXY-METHYL CELLULOSE

[75] Inventors: Kari Edelman, Palokka; Torsten Lindroos, Äänekoski, both of Finland

[73] Assignee: Metsa-Serla Oy, Kirkniemi, Finland

[21] Appl. No.: 148,951

[22] Filed: Jan. 27, 1988

[30] Foreign Application Priority Data

Jan. 27, 1987 [FI] Finland ................................ 870360

[51] Int. Cl.⁵ ...................... C08B 11/00; D21H 13/04
[52] U.S. Cl. .......................................... 162/9; 162/25;
162/56; 162/77; 162/90; 162/157.6; 536/98
[58] Field of Search .................... 162/9, 18, 56, 157.6,
162/90, 182, 77, 25, 40; 536/98

[56] References Cited

U.S. PATENT DOCUMENTS

| | | | |
|---|---|---|---|
| 3,615,254 | 10/1971 | Eichenseer | 536/98 |
| 4,063,018 | 12/1977 | Ohnaka et al. | 536/98 |
| 4,426,518 | 1/1984 | Omiya | 536/98 |
| 4,444,621 | 4/1984 | Lindahl | 162/56 |
| 4,507,473 | 3/1985 | Bernert et al. | 536/98 |
| 4,508,895 | 4/1985 | Balser | 536/98 |

FOREIGN PATENT DOCUMENTS

| | | | |
|---|---|---|---|
| 902306 | 6/1972 | Canada | 162/24 |
| 0074631 | 3/1983 | European Pat. Off. | 536/98 |

Primary Examiner—Steve Alvo
Attorney, Agent, or Firm—Cushman, Darby & Cushman

[57] ABSTRACT

The invention relates to a method and an equipment for preparing NaCMC, in which (a) cellulose is slushed in the reaction medium until a consistency of c. 5-15%, preferably 5-10%, (b) the fibre suspension obtained in step (a) is thickened to a consistency of c. 20-35% and (c) the pulp containing reaction medium obtained in the second step is homogenized by means of a screw conveyor having a screw pitch which decreases from an inlet opening thereof towards an outlet opening thereof, in order to increase the reactivity, whereby a mercerization activating the cellulose is carried out after step (b) and/or (c), and the cellulose thus pretreated is etherified in a manner known per se.

9 Claims, 1 Drawing Sheet

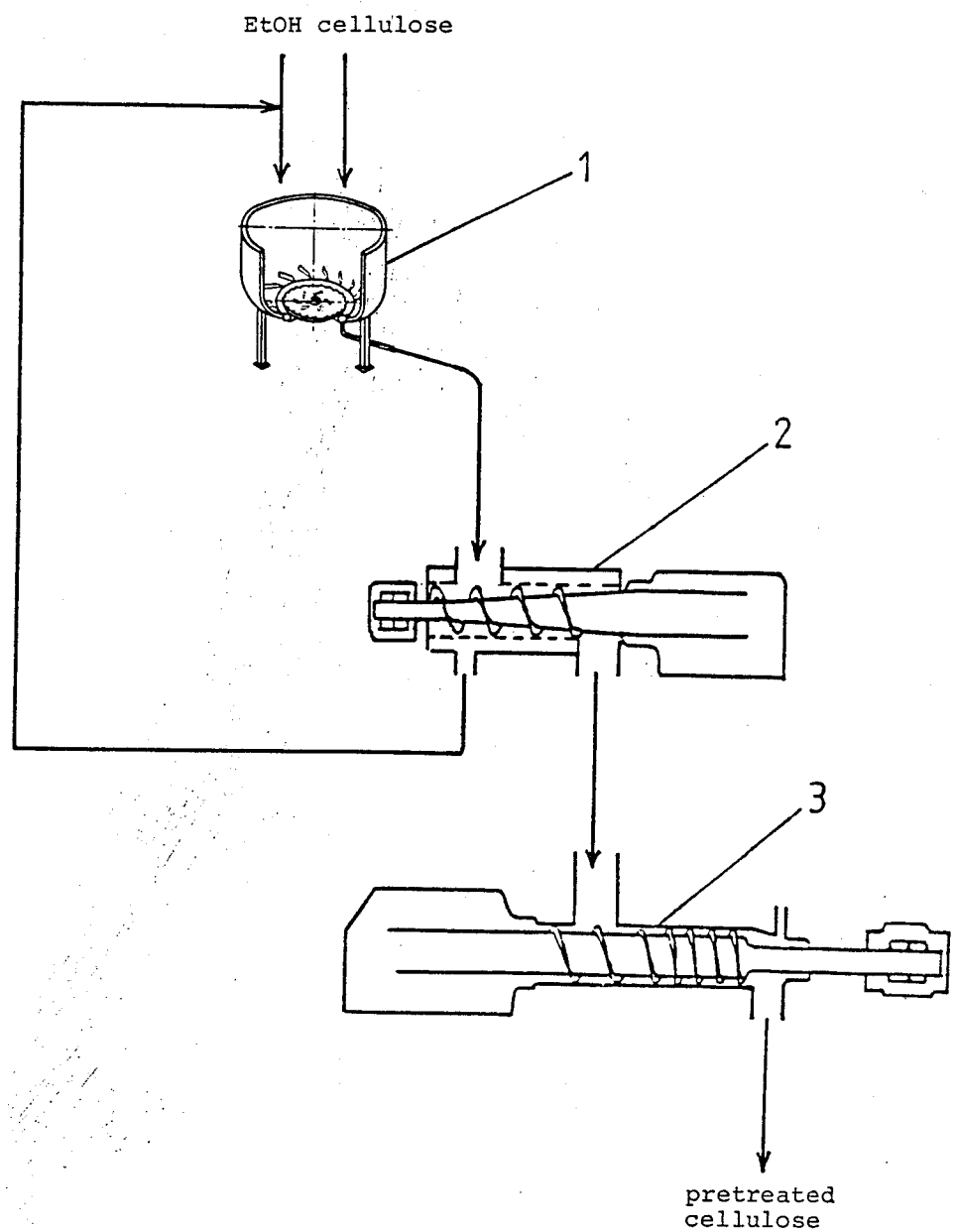

PROCESS FOR PREPARING SODIUM CARBOXY-METHYL CELLULOSE

BACKGROUND OF THE INVENTION

A new process for preparing sodium carboxy-methyl cellulose.

The present invention relates to a process and an equipment for preparing sodium carboxy-methyl cellulose.

When preparing NaCMC and CMC, the cellulose is pretreated mechanically and chemically before the etherification itself. The purpose of the mechanical treatment is to achieve accessibility and homogeneity, and by means of the chemical treatment, the cellulose is activated with NaOH. As a result of the pretreatment, i.e. the mercerization, alkali cellulose is produced, which forms NaCMC together with the etherification reagent.

In sheet mercerization, the pretreatment is based on submerging whole cellulose sheets in an 18% NaOH water solution. The amount of NaOH remaining in the sheets is regulated by compression of the sheets, the problem then being that the NaOH content will be too large with regard to an economical accomplishment of the reaction. Only long-fibred cellulose qualities can be successfully used in the process because of the disintegration of the sheets. The excess NaOH removed by compression is difficult to neutralize because of the impurities suspended and dissolved from the pulp.

In slurry methods, cellulose is finely ground and treated with a dissolvent and NaOH. As reaction medium, a large number of various dissolvents are used, as for instance isopropyl alcohol or acetone. In the slurry method 10–25 l of solvents is typically used per kg of cellulose, often requiring the use of solid NaOH for the mercerization of the cellulose. Besides being expensive, the treatment of solid NaOH on an industrial scale is extremely difficult because of its great hygroscopicity. The reaction being accomplished at a thin consistency, large reactors are additionally needed in order to achieve a certain capacity. Moreover, a great distilling capacity is required for regenerating the dissolvent.

In certain slurry methods, the cellulose has to be ground to as low a particle size as 200 μm, this being slow and difficult for maintenance. The slurry method has been used in the U.S. Pat. No. 3,284,441 and the FI patent specification 71750, among others.

Sheeted cellulose can also be dispersed in a shredder and pneumatically transferred into the reactors, to which the reaction medium and an aqueous, about 50% NaOH solution is subsequently added, by means of which the cellulose is transformed into reactive alkali cellulose (Finnish Chemical Industry, Chemical Industry Federation of Finland, p. 149).

In the kneader, i.e. breaking methods, the mercerization takes place at a consistency corresponding to 1–6 l/kg of the dissolvent amount. In methods of the kneader type, the cellulose is not ground as finely as in slurry methods. Thus, the cellulose is unhomogeneous, and difficult to mix, so that the method poses extremely high requirements as to the reactor technique to be used. In less expensive reactor types, large amounts of chemicals have to be used in order to produce end products of good quality.

SUMMARY OF THE INVENTION

The purpose of the above invention is to achieve a method and an equipment for pretreating cellulose, by means of which the above disadvantages can be eliminated. The invention is characterized in that the pretreatment comprises (a) slushing of the cellulose into the reaction medium until a consistency of about 5–15%, preferably of 5–10%.

(b) concentrating of the fibre suspension obtained in step (a) to a consistency of about 25–35% and (c) homogenization with a "FROTAPULPER" TM device (i.e., a screw conveyor, the pitch of which decreases from the inlet opening towards the outlet opening) of the pulp, containing reaction medium and obtained in the second step, in order to increase the reactivity, whereby the mercerization, activating the cellulose, is carried out after steps (b) and/or (c), and etherification of the cellulose, thus pretreated, in an otherwise conventional manner. This has allowed the production of cellulose ethers of good quality, at a high consistency without dry beating or shredding of the cellulose, which is difficult to control, and using up to 30% less chemicals than before.

The pretreatment of the method of preparing CMC according to the invention is essentially carried out in three steps.

In the first step, the essentially dry cellulose sheets and the reaction medium are fed into the pulper, where they are transformed into a fibre suspension. The use of a reaction medium at such an early stage facilitates markedly the mechanical treatment of the cellulose. As reaction medium, any agent used in CMC production is appropriate, preferably ethanol. The slushing is performed by means of an ordinary pulper to a consistency of about 5–15%, preferably of 5–10%.

In the second stage, the fibre suspension pumped from the first step is thickened to a consistency of about 20–35%. As a thickener, a common device such as a rotating screen drum can be used. However, the use of a continuously fed screw press is particularly advantageous. The function of the screw press comprises a screw equipped with an expanding shaft, which forwards the fibre suspension in a screen channel of even thickness, pressing simultaneously the excess reaction medium through the walls of the screen channel. The excess reaction medium is preferably recovered, possibly filtered, and pumped back into the pulper for use in slushing the cellulose.

In the third step, the pulp containing reaction medium, conveyed from the second step to the third step, e.g. by means of a screw conveyor, is further treated in order to disperse fibre bundles and to work the fibres by means of a so-called "FROTAPULPER" TM device. The frota-pulper is a screw conveyor, the pitch of which decreases from the inlet opening towards the outlet opening. Owing to the decreasing pitch, the pulp is worked homogeneously and the accessibility of the cellulose or the alkali cellulose increases so that the need for chemicals is significantly reduced. A usable screw conveyor is, e.g., the "FROTAPULPER" TM device of Kamyr AB, type H400 or H1000.

Between the second and the third step, a mercerization step can possibly be carried out. The working with a "FROTAPULPER" TM then takes place in the presence of NaOH, which increases and accelerates the production of reactive alkali cellulose. The mercerization step may also be a premercerization, its main purpose then being to increase the accessibility and the homogeneity by a simultaneous mechanical and chemical treatment.

After the third step, the pretreated pulp is transferred into the reactor, in which it is subject to mercerization (in case the mercerization has not already been carried out between the second and the third step) and to etherification. The method and the equipment are of a common type and known per se.

The method according to the invention is evidently appropriate for the production of other cellulose derivatives as well, besides the production of CMC and NaCMC. Such derivatives are those in which the cellulose is activated by producing homogenous alkali cellulose, as for instance, cellulose hydroxyethers and ethylcellulose.

BRIEF DESCRIPTION OF THE DRAWING

The invention is described in detail below with reference to the FIGURE, which represents the method and device of a preferred embodiment of the invention.

DETAILED DESCRIPTION

Example 1

300 kg of spruce sulphite cellulose, having a 92% alpha content, was defibrated into 93% ethyl alcohol until a 5% consistency by means of a typical pulper 1 used in paper industry. After a disintegration time of half an hour, the slush still contained undisintegrated knots, which by experience, are know to be detrimental to the production of cellulose ethers. The temperature was then 35° C. When applying longer pulping durations, an excessive rising of the temperature requires efficient cooling.

From the pulper, the mixture was pumped with a monopump into the screw press 2, where the consistency was raised to 25%. The ethyl alcohol separated by the compression was recovered for recycling.

The ethanol-containing product deriving from the screw press was conducted by means of a screw conveyor to the "FROTAPULPER" TM device 3, where the disintegration of the fibre knots and the working of the fibres took place. The energy consumption was about 40 kWh/t of cellulose. The temperature was 55° C. after the working. Subsequently, the ethanol contaning pulp was transferred into a reactor of kneader type for the preparation of sodium carboxy-methyl cellulose, which took place in a manner known per se to a person skilled in the art.

As a result of the optimization, it was observed that a cellulose pretreated according to the above method allowed a reduction of the used amounts of chemicals by 30% compared to dry shredding or dry beating.

We claim:

1. A process for preparing sodium carboxy-methyl cellulose, comprising:
   (a) conducting a pretreatment which includes:
      (i) slushing cellulose into a reaction medium until a fiber suspension having a consistency of about 5 to 15 percent is achieved;
      (ii) thereafter thickening said fiber suspension until a pulp-containing reaction medium having a consistency of about 20 to 35 percent is achieved;
      (iii) thereafter homogenizing said pulp-containing reaction medium using a screw conveyor having a screw pitch which decreases from an inlet opening thereof towards an outlet opening thereof, and thereby increasing the reactivity of said pulp; and
      (iv) after conducting step (ii), mercerizing said pulp, thereby activating cellulose therein; and
   (b) etherifying said activated cellulose.

2. The process of claim 1, wherein:
said step of slushing is carried out until a fiber suspension having a consistency of about 5 to 10 percent is achieved.

3. The process of claim 1, wherein:
the mercerization of step (iv) is conducted in two stages, including a premercerization conducted after step (ii), and a main mercerization conducted after step (iii).

4. The process of claim 1, comprising:
consuming about 40 kwh/t of cellulose in conducting step (iii).

5. The process of claim 1, further comprising:
removing reaction medium in step (ii) and recycling at least some of said removed reaction medium to step (i) for slushing said cellulose.

6. The process of claim 1, wherein:
said reaction medium is ethanol.

7. The process of claim 1, wherein:
in step (i), said cellulose is slushed into said reaction medium using a pulper.

8. The process of claim 1, wherein:
in step (ii), said thickening is carried out using a continuously fed screw press.

9. The process of claim 1, wherein:
in step (b), the activated cellulose is kneaded in a kneader-type reactor.

* * * * *